(12) United States Patent
Abdel-Mottaleb et al.

(10) Patent No.: US 6,226,636 B1
(45) Date of Patent: May 1, 2001

(54) SYSTEM FOR RETRIEVING IMAGES USING A DATABASE

(75) Inventors: Mohamed Abdel-Mottaleb; Santhana Krishnamachari, both of Ossining, NY (US)

(73) Assignee: Philips Electronics North America Corp., New York, NY (US)

( * ) Notice: Subject to any disclaimer, the term of this patent is extended or adjusted under 35 U.S.C. 154(b) by 0 days.

(21) Appl. No.: 09/197,315

(22) Filed: Nov. 20, 1998

(51) Int. Cl.[7] .................................................... G06F 17/30
(52) U.S. Cl. ..................... 707/4; 707/5; 707/6; 707/104
(58) Field of Search .................... 707/4, 5, 101, 707/102; 382/140, 226, 103, 118, 199, 236, 128, 240; 358/455, 447, 296; 395/131; 348/413

(56) References Cited

U.S. PATENT DOCUMENTS

| | | | |
|---|---|---|---|
| 4,680,803 | * 7/1987 | Dilella | 382/140 |
| 4,731,606 | * 3/1988 | Bantz et al. | 345/118 |
| 4,989,258 | * 1/1991 | Takahashi et al. | 382/226 |
| 5,159,647 | * 10/1992 | Burt | 382/103 |
| 5,200,841 | * 4/1993 | Kotaki et al. | 358/455 |
| 5,337,403 | 8/1994 | Klingman | 395/140 |
| 5,360,968 | 11/1994 | Scott | 235/454 |
| 5,502,495 | * 3/1996 | Bannai et al. | 358/447 |
| 5,509,111 | * 4/1996 | Hong et al. | 395/131 |
| 5,761,655 | * 6/1998 | Hoffman | 707/4 |
| 5,832,115 | * 11/1998 | Rosenberg | 382/199 |
| 5,859,921 | * 1/1999 | Suzuki | 382/118 |
| 5,867,277 | * 2/1999 | Melen et al. | 358/296 |
| 5,901,248 | * 5/1999 | Fandrianto et al. | 382/236 |
| 5,969,766 | * 10/1999 | Kim | 348/413 |
| 5,987,456 | * 11/1999 | Ravela et al. | 707/5 |
| 6,005,981 | * 12/1999 | Ng et al. | 382/240 |
| 6,014,671 | * 1/2000 | Castelli et al. | 707/101 |
| 6,047,080 | * 4/2000 | Chen et al. | 382/128 |
| 6,119,123 | * 9/2000 | Elenbaas et al. | 707/102 |

OTHER PUBLICATIONS

PHA 23,390, U.S. application No. 09/062,940, Filed: Apr. 20, 1998.

MA W Y et al: "NeTra: a toolbox for navigating large image databases"Proceedings. International Conference on image processing (CAT. No. 97CB36144), Proceedings of International Conference on Image Processing, Santa Barbara, CA, USA, Oct. 26–29, 1997, vol. 1, pp. 1–3, XP000792837 1997, Los Alamitos, CA, USA, IEEE Comput. Soc, USA ISBN: 0–8186–8183–7 p. 2, paragraph 2 –p. 8, paragaraph 3; figure 2, 1,2,7,8,14–17.

(List continued on next page.)

*Primary Examiner*—Wayne Amsbury
*Assistant Examiner*—Thuy Pardo
(74) *Attorney, Agent, or Firm*—Gregory L. Thorne (57) ABSTRACT

The system builds a database which stores data corresponding to a plurality of images. To begin, the system divides each image into N (N≧1) regions. Then, for each of the N regions, the system calculates a histogram of the region, generates a binary representation of the histogram, and stores data corresponding to the image in a binary tree based on the binary representation. The database may then be used to determine images which are similar to a query image. To do this, the system divides the query image into N regions, each of which corresponds to one of the binary trees in the database. Data corresponding to one or more images in the database is then retrieved from the binary trees based on the N regions. The system then determines which of these images is similar to the query image based on the retrieved data.

59 Claims, 8 Drawing Sheets

OTHER PUBLICATIONS

Androutsos D et al: "Extraction of detailed image regions for content–based image retrieval" Proceedings of the 1998 IEEE International Conference on Acoustics, Speech and Signal Processing, ICASSP '98 (CAT. No. 98CH36181), Proceedingss of the 1998 IEEE International Conference on Acoustics, Speech and Signal Processing, Seattle, WA, USA, 12–1, pp. 3713–3716 vol.6, XP002137675 1998, New York, NY, USA, IEEE, USA ISBN: 0–7803–4428–6 the whole document, 1,2,7,14–17.

Yamamoto H et al: "Content–based similarity retrieval of image based on spatial color distributions" Proceedings 10th International Conference on Image Analysis and Processing. Proceedings of ICIAP '99—10th International Conference on Image Analysis and Processing, Venice, Italy, Sep. 27–29, 1999, pp. 951–956, XP002137676 1999, Los Alamitos, CA, USA, IEEE Comput. Soc, USA ISBN: 0–7695–0040–4, 1,7,14–17.

* cited by examiner

SYSTEM FOR RETRIEVING IMAGES USING A DATABASE

BACKGROUND OF THE INVENTION

1. Field of the Invention

The present invention is directed to a system which builds a database of images, which retrieves images from the database based on a "query" image, and which determines whether the retrieved images are similar to the query image. In building the database, the system generates binary representations for regions of an image, and then uses these binary representations to store pointers to the image in binary trees. In retrieving images from the database, the system generates binary representations of the query image, selects an image from the database by traversing its binary trees using the binary representations, and retrieves pointers for the image from the binary trees.

2. Description of the Related Art

In recent years, it has become commonplace for personal computers and other digital hardware to process and display digital images. This is due, in no small part, to the increase in popularity of digital video on the Internet. As a result of this increased use of digital imagery, it has become necessary to retrieve images from increasingly larger image databases. This typically does not present a problem if there is some way to readily identify the images, such as via a file name or the like.

On the other hand, it is more difficult to retrieve images from a large database if the only way to retrieve the images is based on their content, as is oftentimes tile case, e.g., for digital video and for scanned images. For example, a user may wish to locate a video clip based on a single frame of video, or to locate a particular frame of video within a video clip. Similarly, a user may wish to determine which of a plurality of pre-stored images best matches a scanned image. In these cases, image retrieval can be difficult.

In view of the foregoing, researchers have developed systems for selecting and retrieving an image based on its content. In general, these systems operate by inputting a "query" image, such as an individual frame of digital video, a scanned image, or the like, determining which image in a database is similar to the query image, and then retrieving that image. Conventional systems of this type, however, suffer from several drawbacks, particularly with respect to operational speed.

Specifically, conventional content-based image retrieving systems tend to be relatively slow. That is, conventional systems typically rely on some form of feature extraction and comparison in order to determine which images in the database are similar to the query image. While such comparisons can provide accurate results, they require a significant amount of processing, particularly in cases where the images have a relatively high resolution, or where there are numerous comparisons to be made. This excess processing significantly slows down the process.

Accordingly, there exists a need for a content-based image retrieval system that addresses the foregoing and other drawbacks of conventional systems. In particular, there exists a need for a system which provides for accurate content-based image retrieval, and which also operates more quickly than its conventional counterparts.

SUMMARY OF THE INVENTION

The present invention addresses the foregoing needs by building a database of images using binary representations of the images' histograms, and then determining which image(s) in the database are similar to a query image by traversing the database using a binary representation of the query image. By using binary representations of the images to build the database and to determine similar images, the invention reduces the amount of processing required to retrieve images based on their content. As a result, the invention operates more quickly than its conventional counterparts.

Thus, according to one aspect, the present invention is a system (e.g., a method, an apparatus, and computer-executable process steps) for building a database which stores data corresponding to a plurality of images. The system begins by dividing each image into N (N≧1) regions. Thereafter, for each of the N regions of an image, the system calculates a histogram of the region, generates a binary representation of the histogram, and stores data corresponding to the image in a binary tree based on the binary representation.

In preferred embodiments of the invention, the system calculates the histogram for the region based on color image data in the region, and generates the binary representation by performing a Haar transform on the histogram to generate wavelet coefficients therefor and then quantizing the coefficients. By virtue of these features of the invention, it is possible to generate a substantially unique binary representation of each image, thereby eliminating the need to store excessive amounts of data in the database. As a result, databases can be generated which contain data for a relatively large number of images, and which can be traversed relatively quickly without sacrificing accuracy.

In other preferred embodiments of the invention, the system stores the data in the binary tree by comparing at least some bits in the binary representation to corresponding nodes up to a current node in the binary tree, and then determining whether the current node in the binary tree stores data for more than a predetermined number of images. In a case that the current node in the binary tree stores data for more than the predetermined number of images, the invention splits the current node into two subsequent nodes, and stores the data in subsequent nodes. On the other hand, in a case that the current node in the binary tree stores data for less than or equal to the predetermined number of images, the invention stores the data at the current node in the binary tree. By virtue of these features, it is possible to build the database adaptively, such that data can be stored at fewer nodes. As a result, smaller binary trees can be generated, thereby decreasing the size of the database and, consequently, the time that it takes to traverse the database.

According to another aspect, the present invention is a system that determines which images in a database are similar to a query image, where the database is comprised of N (N≧1) binary trees, and where each of the N binary trees stores data corresponding to one or more predetermined images. Specifically, the system divides the query image into N regions, each of which corresponds to one of the N binary trees, and retrieves data corresponding to one or more predetermined images from the binary trees corresponding to the N regions. Thereafter, the system determines which of the predetermined images is similar to the query image based on the retrieved data. By using binary trees and binary representations of image regions, this aspect of the invention reduces the time that it takes to determine which of the images in the database are similar to the query image. By reducing this time, the invention also reduces the overall the amount of time that it takes to retrieve such an image from memory.

In preferred embodiments of the invention, the data corresponding to the predetermined images comprises pointers to the predetermined images in memory. In these embodiments, the system determines which of the predetermined images is similar to the query image based on which pointers were retrieved. Specifically, the predetermined image for which a most number of pointers was retrieved is determined to be the most similar to the query image among the images in the database.

In other preferred embodiments, the system determines which of the predetermined images is similar to the query image by identifying candidate images among the predetermined images that could correspond to the query image, ranking the candidate images in order from an image most likely to correspond to the query image to an image least likely to correspond to the query image, and displaying a list of the ranked candidate images. By virtue of these features, the invention provides a ranked list of candidate images to the user. The user may then view and select the most appropriate image(s).

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Initially, it is noted that the present invention can be implemented by processors in many different types of image processing devices including, but not limited to, video post-processing equipment, a digital television, and a settop box for an analog or digital television system. For the sake of brevity, however, the invention will be described in the context of a networked personal computer ("PC").

Figure 1:
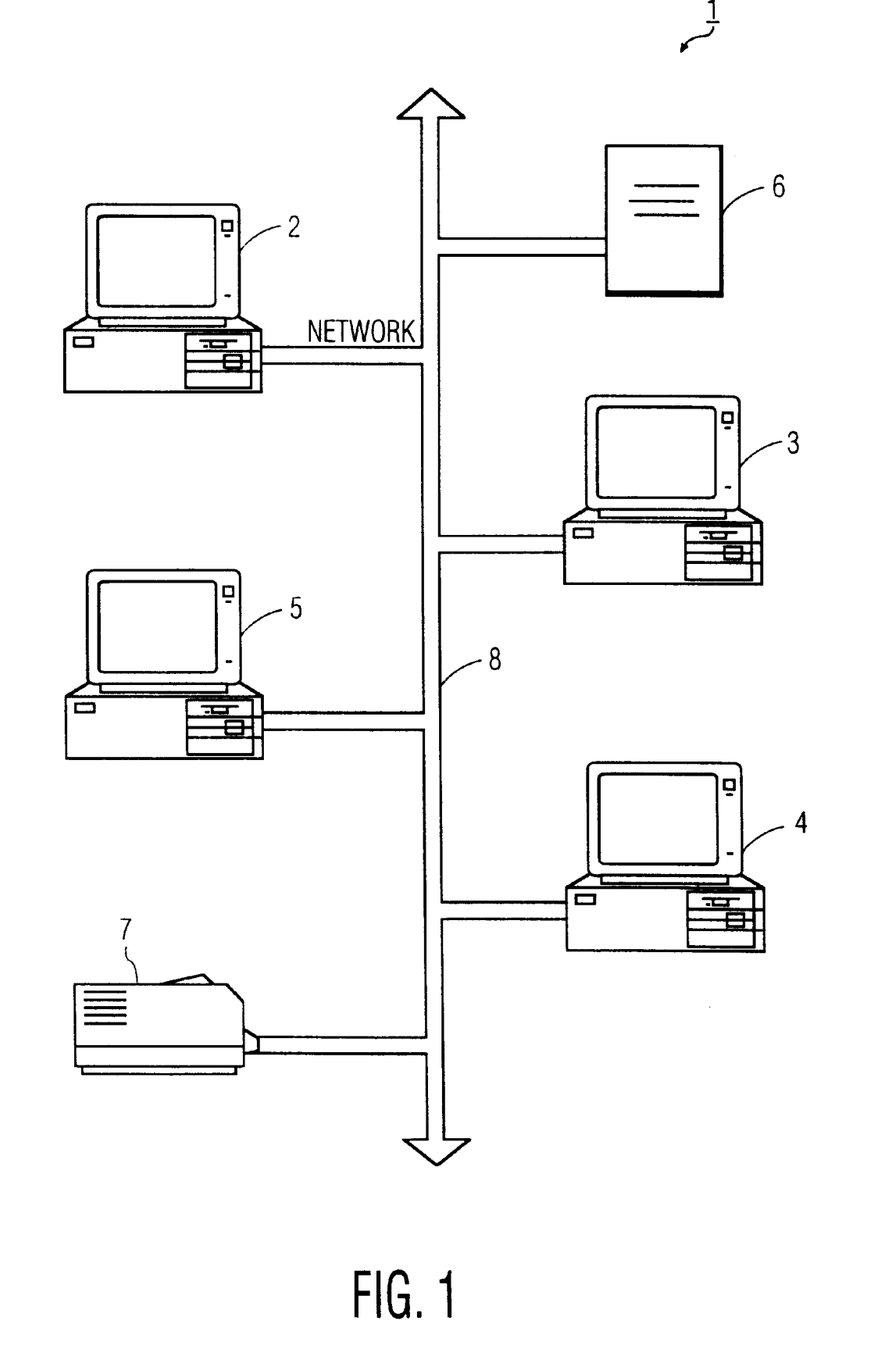
FIG. 1 shows a network system which includes hardware on which the present invention may be implemented.

FIG. 1 shows an example of a network 1 on which the present invention may be implemented. Network 1 can comprise any type of network, such as a local area network ("LAN"), a wide area network ("WAN"), a variable-bandwidth network, an ATM network, the Internet, etc. In preferred embodiments, network 1 includes, e.g., plural PCs 2, 3, 4 and 5, server 6, printer 7, and network medium 8, among other things. Network medium 8 may be, e.g., an Ethernet cable, wireless link, or a combination thereof, over which data packets comprised of image data and other information are transmitted. PCs 2 to 5 include, among other things, resident applications for receiving and processing image data, storing the image data locally, displaying images formed from the image data, and/or outputting the image data back to the network. Image data output to the network may be provided, e.g., to printer 7 or to server 6. In the preferred embodiment of the invention, server 6 maintains a centralized image database which can be accessed by the various PCs on the network for storing and retrieving images. Of course, it should be noted that the invention is not limited to use with a centralized network database. In fact, the invention can be used to store and retrieve images from any type of memory, local, remote or otherwise.

Figure 2:
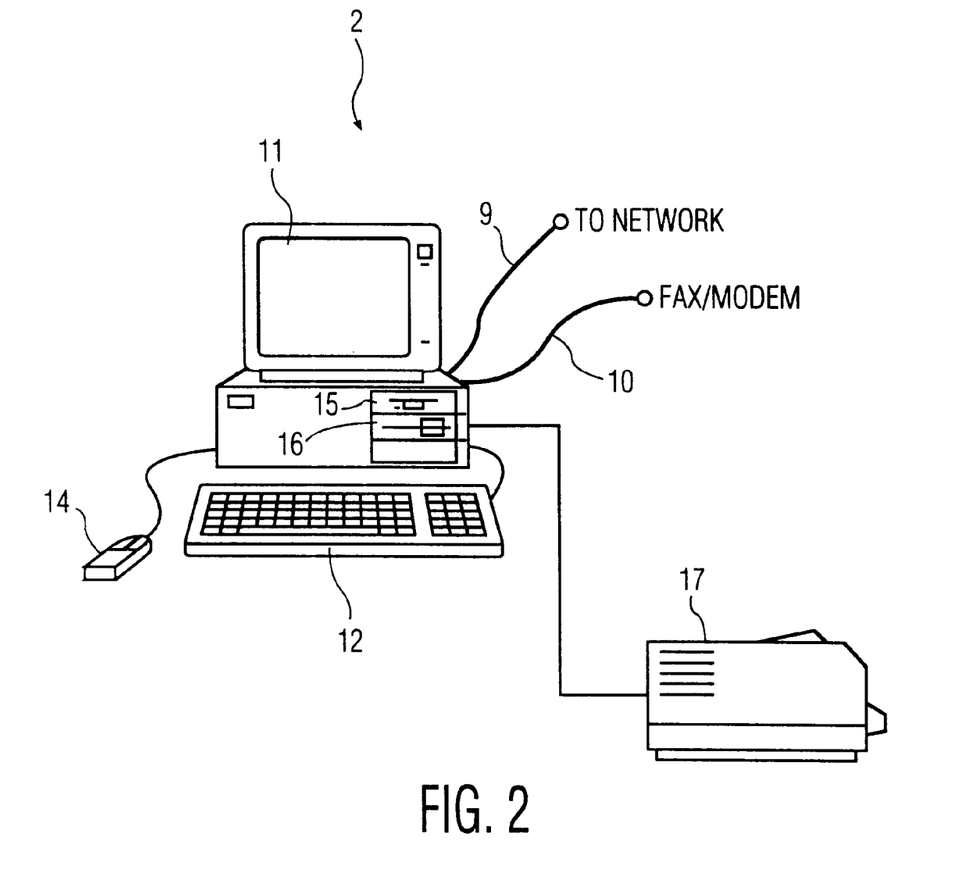
FIG. 2 shows specific hardware on which the invention is implemented.

FIG. 2 shows computing equipment for PC 2, shown in FIG. 1, on which the present invention is implemented. As shown in FIG. 2, PC 2 includes network connection 9 for interfacing to network 1 and fax/modem connection 10 for interfacing with the network or other devices (not shown), particularly those capable of inputting image data. Examples of such devices include, but are not limited to, a digital camera, a digital video camera, and a scanner. PC 2 also includes display screen 11 for displaying information (including images/video) to a user, keyboard 12 for inputting text and user commands, mouse 14 for positioning a cursor on display screen 11 and for inputting user commands, disk drive 15 for reading from and writing to floppy disks installed therein, and CD-ROM drive 16 for accessing data (e.g., images) stored on CD-ROM. PC 2 may also have one or more local peripheral devices connected thereto, such as printer 17.

Figure 3:
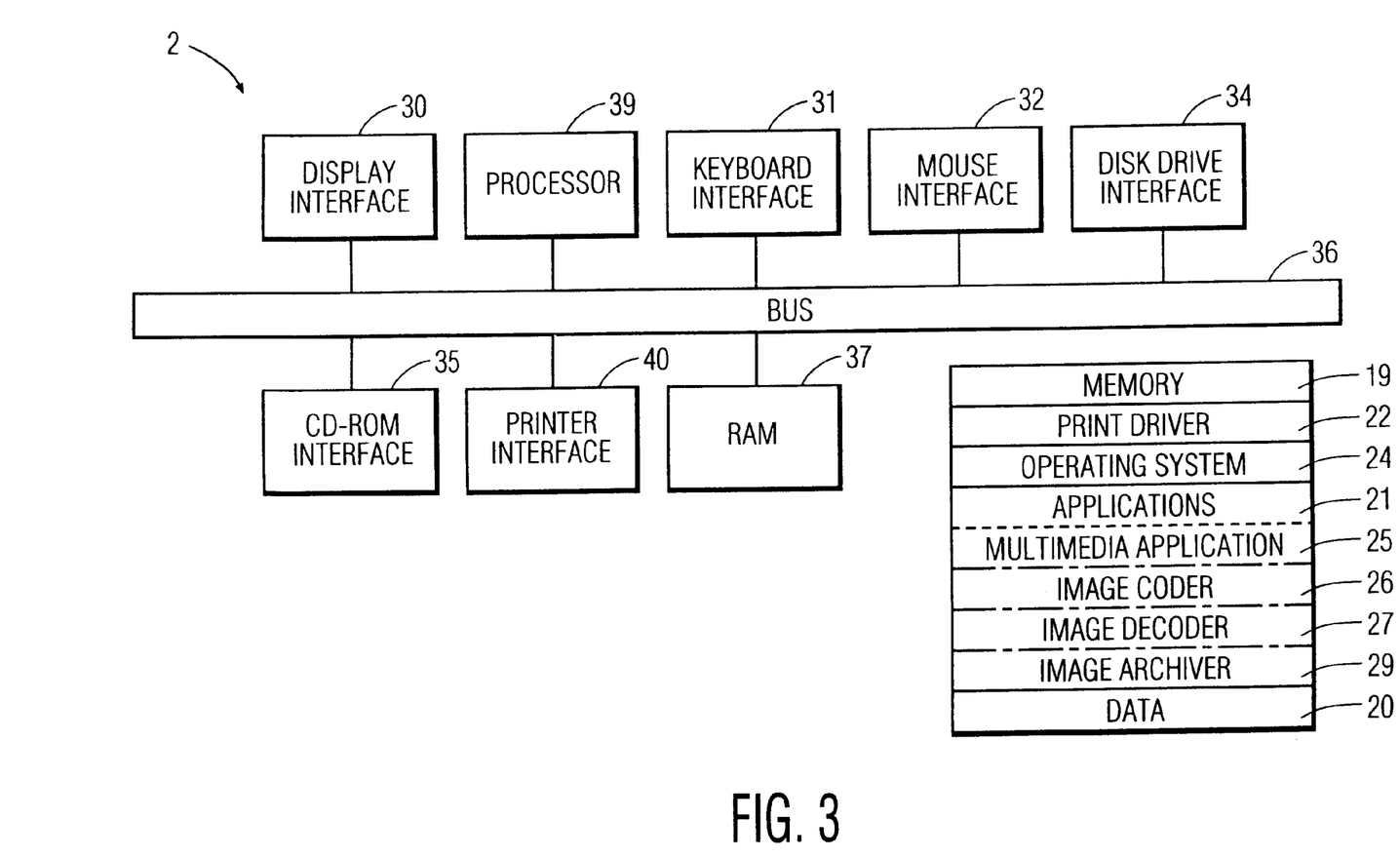
FIG. 3 shows the architecture of that hardware.

FIG. 3 shows the internal structure of PC 2. As shown in FIG. 3, PC 2 includes memory 19, which comprises a computer-readable medium such as a computer hard disk and/or RAID ("redundant array of inexpensive disks"). Memory 19 stores data 20, applications 21, and operating system 24. In preferred embodiments of the invention, operating system 24 is a windowing operating system, such as Microsoft® Windows98; although the invention may be used with other operating systems as well. Among the applications stored in memory 19 are multimedia application 25, image coder 26, image decoder 27, and image archiver 29.

In brief, multimedia application 25 can comprise any of a number of well-known multimedia applications for processing, viewing, and editing still images and/or video. Image coder 26 comprises an application which encodes image data output, e.g., from multimedia application 25. Any of a number of well-known image coding techniques may be used, including, but not limited to, JPEG, DVB, MPEG-1, MPEG-2 and MPEG-4. Image decoder 27 comprises an application which decodes coded image data (e.g., MPEG, JPEG, etc. image data) received from network 1. Image archiver 29 implements the present invention by building a database of such decoded images, storing that database in a memory, such as server 6, and retrieving those images as required. A detailed description of image archiver 29 is provided below.

Returning to FIG. 3, PC 2 also includes display interface 30, keyboard interface 31, mouse interface 32, disk drive interface 34, CD-ROM drive interface 35, computer bus 36, RAM 37, processor 39, and printer interface 40. Processor 39 preferably comprises a microprocessor or the like for executing applications, such those noted above, out of RAM 37. Such applications, including multimedia application 25, image coder 26, image decoder 27, and image archiver 29, may be stored in memory 19 (as noted above) or, alternatively, on a floppy disk in disk drive 15 or a CD-ROM in CD-ROM drive 16. Processor 39 accesses applications (or other data) stored on a floppy disk via disk drive interface 34 and accesses applications (or other data) stored on a CD-ROM via CD-ROM drive interface 35.

Application execution and other tasks of PC 2 may be initiated using keyboard 12 or mouse 14, commands from which are transmitted to processor 39 via keyboard interface 31 and mouse interface 32, respectively. Output results from applications running on PC 2 may be processed by display interface 30 and then displayed to a user on display 11 or, alternatively, output to network 1 via network connection 9. To this end, display interface 30 preferably comprises a display processor for forming images based on image data provided by processor 39 over computer bus 36, and for outputting those images to display 11. As described in detail below, the data for these images may be retrieved, e.g., from server 6, via image archiver 29.

In this regard, image archiver 29 comprises computer-executable code (i.e., process steps) which is used both to build a database comprised of a plurality of images and to retrieve images, using the database, which are similar to an input, or "query", image. To build the database, image archiver 29 divides an input image into N (N≧1) regions. Thereafter, for each region, image archiver 29 calculates a histogram of the region, generates a binary representation of the histogram, and stores data corresponding to the image in a binary tree based on the binary representation. To retrieve image(s) similar to a query image using the database, the system divides the query image into N regions, each which corresponds to one of the binary trees. It then retrieves data corresponding to one or more predetermined images from the binary trees corresponding to the N regions, and determines which of the predetermined images is similar to the query image based on the retrieved data.

[First Embodiment]

Figure 4:
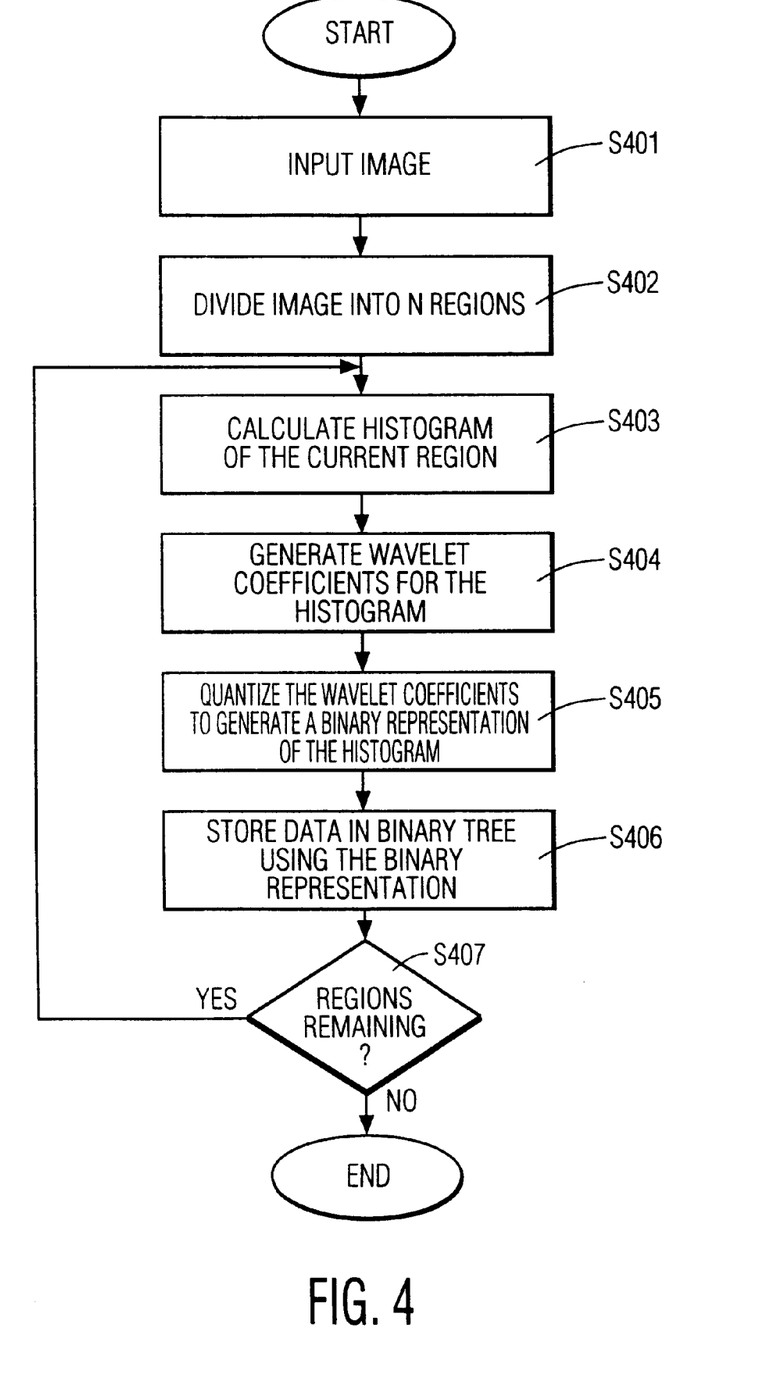
FIG. 4 is a flow diagram showing process steps for building a database in accordance with the present invention.
Figure 5A:
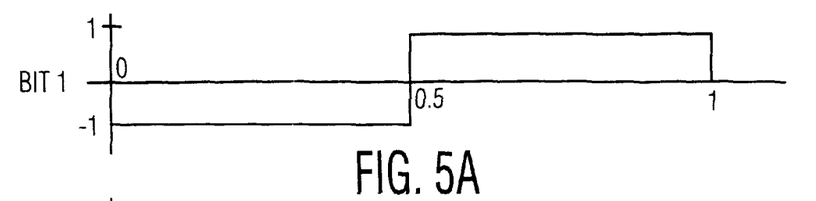
FIG. 5 shows Haar basis functions of lengths 0, 1 and 2.
Figure 5B:
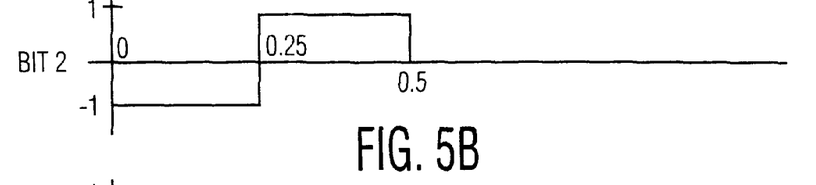
Figure 5C:
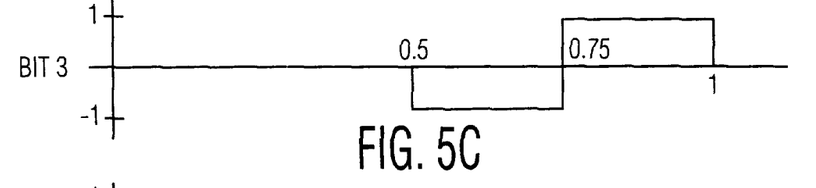
Figure 5D:
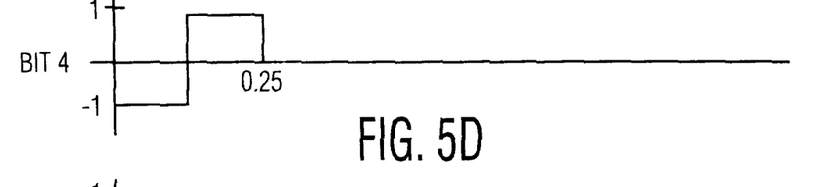
Figure 5E:
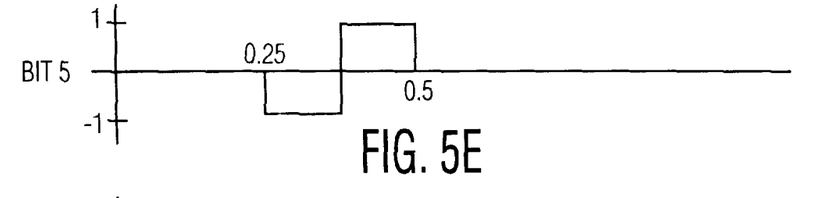
Figure 5F:
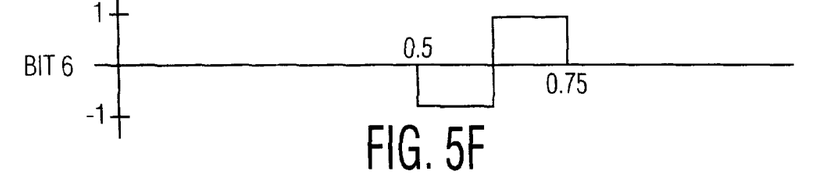
Figure 5G:
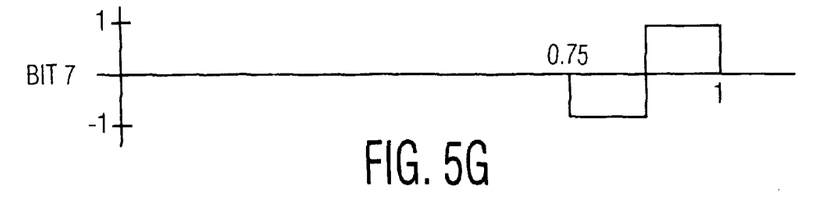

In more detail, FIG. 4 shows process steps for implementing the database building aspect of the invention. To begin, step S401 inputs an image, e.g., to PC 2 for inclusion in the image database. In this regard, as noted above, the image database is preferably resident on a centralized network server, such as server 6. Of course, the database may be local as well. Data for the image may be input from one of a variety of sources. For example, it may be downloaded over the network (as is often the case with frames video) or it may be input directly from an image inputting device, such as a scanner, digital camera, or digital video camera.

Step S402 then divides the input image into N (N≧1) regions. In preferred embodiments, step S402 divides the image into N×N substantially contiguous, equally-sized, rectangular regions that cover the entire image. It should be noted, however, that the invention is not limited to dividing the image into rectangular regions, much less into rectangular regions that cover the entire image or that are equally-sized. However, the following assumes that such is the case.

Next, steps S403 to S406 are repeated for each of the rectangular regions produced in step S402. Specifically, step S403 calculates a histogram of a region). In preferred embodiments of the invention, the histogram is calculated based on color image data in the region, such as RGB (red, green, blue), CMYK (cyan, magenta, yellow, black), LUV, etc. data. In a case that the input image is a gray-scale image, the histogram may be calculated, instead, based on gray-scale image data therefor. The invention may also be configured to calculate the histogram based on features of the image besides color.

Following step S403, step S404 performs a Haar wavelet transform on the histogram using Haar basis functions of length m, where m is a positive integer greater than 0 that is determined experimentally to provide an optimum number of Haar wavelet coefficients. As is well-known in the art, the Haar wavelet transform is based on an orthonormal system of functions, such that for any continuous function, the series $$f(x) = \sum_{j=0}^{\infty} \sum_{k=0}^{2^j-1} a_{2^j+k} w(2^j x - k) \tag{1}$$

converges to f(x) uniformly over the interval 0≦x<1. This leads to a set of rectangular basis functions, such as that depicted in FIG. 5. Specifically, FIG. 5 shows Haar basis functions of lengths 0, 1 and 2, with subsequent basis functions of lengths 3, 4 . . . m following the pattern shown. Step S404 uses such basis functions to provide Haar wavelet coefficients for the histogram generated in step S403. Of course, it should be noted that the invention is not limited to using Haar basis functions, and that other functions/transforms can be used to determine the coefficients in this step. However, the following assumes that Haar wavelet coefficients were generated, as opposed to some other type of coefficients.

Once the Haar wavelet coefficients have been generated in step S404, step S405 performs binary quantization on the coefficients in order to generate a binary representation of the histogram having m bits. In preferred embodiments of the invention, the binary representation of the histogram is generated in accordance with the pseudo-code set forth in the Appendix attached hereto. Specifically, in this pseudo-code, a histogram h having n bins and m Haar wavelet coefficients is calculated by invoking Binary (h[1, . . . n]) and performing the steps thereof. Of course, alternative binary quantization methods may also be used with the present invention.

When generating the binary representation of the histogram, as in the pseudo-code, differences between portions of the histogram may be marginal (e.g., below a threshold $T_k$), such that it is not clear whether the binary representation for the histogram should contain a "0" or a "1" at one or more points thereof. In these special cases, more than one (e.g., two, three, etc.) binary representation may be generated for the same histogram, one containing a "0" and the other containing a "1" at each "questionable" point, in order to account for all possibilities.

Figure 6:
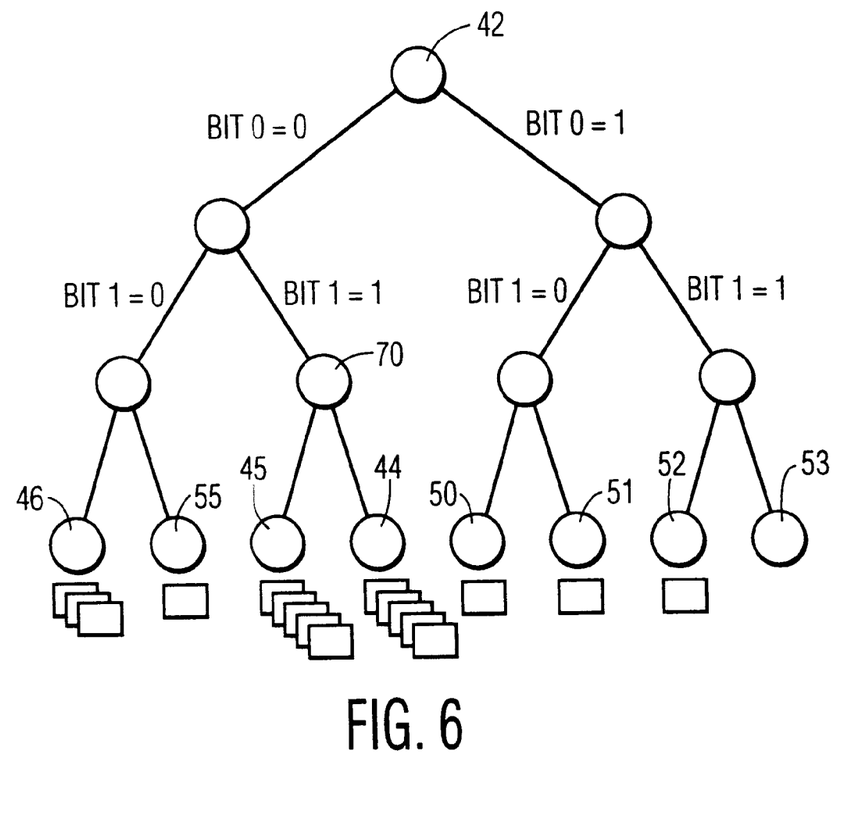
FIG. 6 shows a binary tree used in the database of the present invention.

Next, step S406 stores data corresponding to the input image in a binary tree, such as that shown in FIG. 6, based on the binary representation generated in step S405. In this embodiment, since there are m bits in the binary representation, the binary tree will have m levels and $2^m$ nodes, or "leaves". The data stored in the binary tree comprises one or more pointers to locations in memory where the input image is stored. Thus, if the input image is stored on a local memory of the PC, the pointer would indicate as such. Likewise, if the input image is stored in the memory of a remote network PC or a remote network server, the pointers would so indicate.

To store the data in a binary tree, the invention traverses the binary tree using the binary representation generated in step S405. Specifically, the invention compares each bit in the binary representation to a corresponding node in the binary tree, and then branches either to the left or to the right in the binary tree based on whether a match is achieved between a corresponding bit and node. For example, with reference to FIG. 6, for a binary representation of "011", at node 42, the invention determines whether the $0^{th}$ bit of the binary representation has a value of 0 or 1. In this example, the $0^{th}$ bit has a value of 0, so the invention branches to the left. Next, the $1^{st}$ bit is tested. Here, the $1^{st}$ bit has a value of 1, so the invention branches to the right. Finally, the $2^{nd}$ bit is then tested. Here, $2^{nd}$ bit has a value of 1, so the invention again branches to the right, arriving at an end point in the binary tree, namely node 44. There, the invention stores data (e.g., a pointer) to the input image.

Following step S406, processing proceeds to step S407. Step S407 determines whether there are any remaining image regions of the input image that need to be processed. If there are such regions, processing returns to step S403, whereafter steps S403 to S406 are repeated for a new image region. This results in data for each of the N regions being stored in a separate binary tree. Thus, the invention maintains the same number of binary trees, here N (N≧1), as there are regions of the input image. These binary trees, taken together, comprise the database of the present invention. Once all of the image regions have been stored in binary trees, processing ends. Processing on subsequent images may then be performed in the manner described above so as to store data corresponding to additional images.

At this point, it is noted that data corresponding to similar or identical image regions from different images may be stored at the same point in a binary tree. This is depicted, e.g., in nodes 44, 45 and 46 of FIG. 6, each of which includes pointers for more than one image "□". Accordingly, if pointers to an image are to be deleted from the database, they must be deleted from each of the binary trees.

Figure 7:
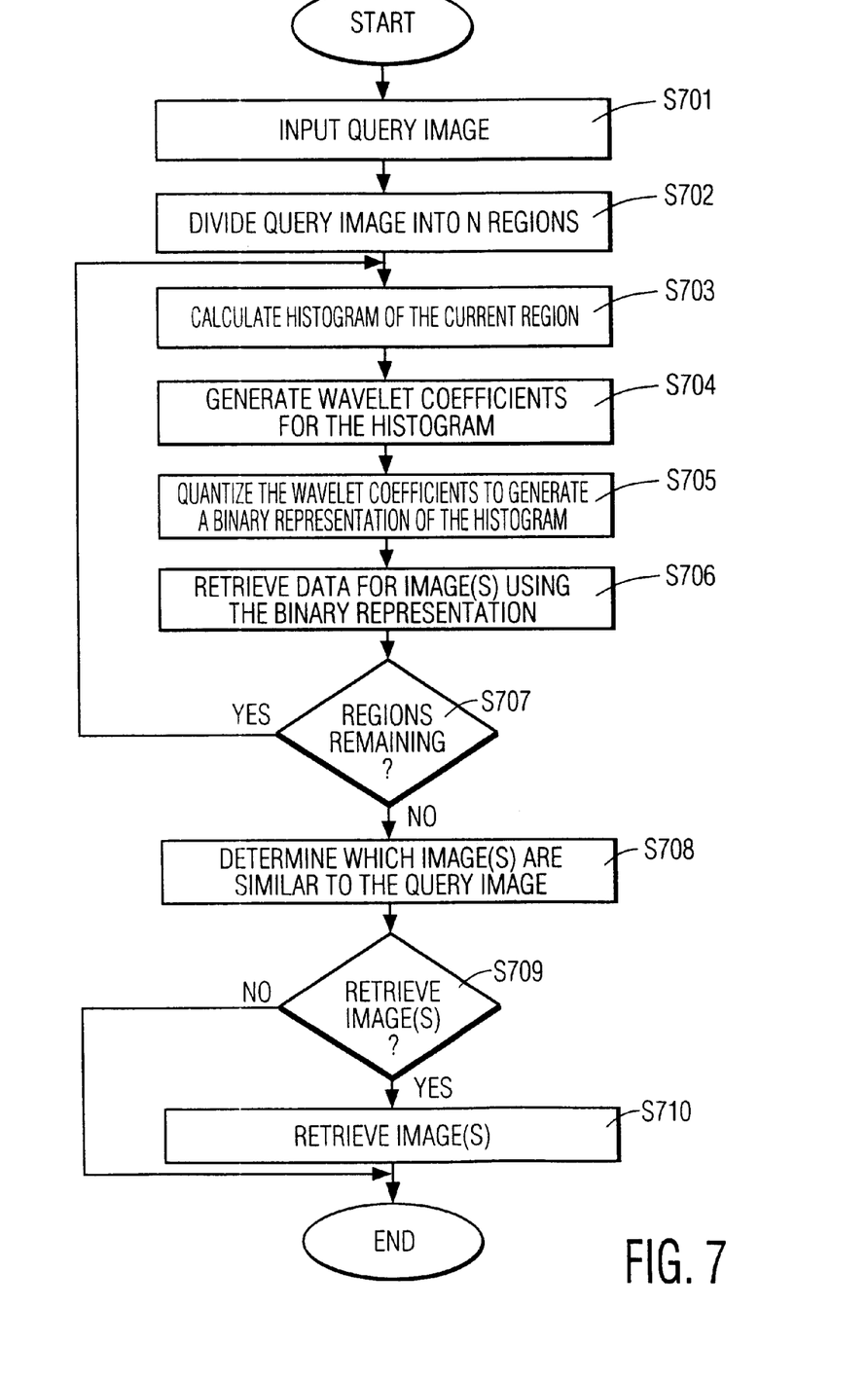
FIG. 7 is a flow diagram showing process steps for retrieving images from the database built by the invention.

The pointers stored above, together with the N binary trees, are used by the invention to effect image retrieval and to determine the degree of similarity between images. In this regard, FIG. 7 shows process steps for implementing this aspect of the invention. To begin, step S701 inputs a query image. As was the case in step S401 above, the query image may be input from one of a variety of different sources, e.g., it may be downloaded over the network, input directly from an image inputting device, such as a scanner, digital camera, or digital video camera, etc.

Next, step S702 divides the query image into the same number of regions as there are binary trees in the database. Here, the database comprises N (N≧1) binary trees. Accordingly, step S702 divides the query image into N regions, each of which corresponds to one of the binary trees. Thereafter, steps S703 to S706 are repeated for each of the N regions of the query image.

In this regard, the processing performed in steps S703 to S705 is substantially identical to that performed in steps S403 to S405 above. Accordingly, a detailed description thereof is omitted here for the sake of brevity. To summarize, step S703 calculates a histogram of the current region of the query image based on color image data or the like within the region. Step S704 performs a Haar transform on the histogram of step S703 using a Haar basis function having length m to generate wavelet coefficients therefor; and step S705 performs binary quantization on these coefficients to generate a binary representation of the histogram comprised of m bits.

Step S706 then retrieves, from the binary tree for the current region, data for one or more predetermined images. This is done by traversing the binary tree using the binary representation of the histogram of the current region until an end point of the binary tree is reached. Traversing the histogram here is done in the same manner as described above, i.e., comparing each bit in the binary representation to a corresponding node in the binary tree and branching left or right in the binary tree based on whether a match is achieved. Accordingly, a detailed description thereof is omitted here. Once the end point of the histogram has been reached, step S706 retrieves the data stored there. Specifically, in the preferred embodiment, step S706 retrieves the pointers to the various images stored at the end point of the binary tree.

Thereafter, step S707 determines whether there are any image regions remaining to be processed. If there are such regions, processing returns to step S703, whereafter the foregoing is repeated. If there are no such regions, processing proceeds to steps S708 and S709. Generally speaking, these steps determine which image(s) from the database are similar (but not necessarily identical) to the query image, and then retrieve one or more of these images from memory.

More specifically, step S708 identifies which of the images whose pointers were retrieved from the database is similar to the query image. Specifically, in this embodiment, an image for which the most number of pointers was retrieved is identified as being most similar (e.g., possibly identical) to the query image. Thus, for example, if N=6, meaning that the query image was divided into 6 image regions and that there are 6 binary trees in the database, an image's degree of similarity to the query image is determined based on six sets of pointers retrieved in step S706. For example if pointers [1,2,4] were retrieved from the first binary tree in the database in step S706, no pointers were retrieved from the second binary tree, pointers [1,3,4] were retrieved from the third binary tree, pointers [1,4,5] were retrieved from the fourth binary tree, pointers [1,2] were retrieved from the fifth binary tree, and pointer [1] was retrieved from the sixth binary tree, the image corresponding to pointer [1] will be identified as closest (i.e., most similar to) to the query image, since pointer [1] was retrieved most often from the binary trees. The other images are less similar.

In this regard, step S708 may rank the images whose pointers are stored in the database as "candidate images" based on their degree of similarity to the query image. That is, step S708 may rank the candidate images in order from an image that most closely corresponds to the query image to an image that least closely corresponds to the query image. This ranking is preferably based on the number of pointers corresponding to each candidate image. Thus, for the example given above, the ranking would be as follows, starting with the most likely candidate: [1], [4], [2], [3] and [5] tie. A list of these ranked candidate images may then be displayed to the user, e.g., on display screen 11, from which the user may view the candidate images and select whichever one is deemed appropriate under the circumstances.

Following step S708, processing proceeds to step S709. Step S709 determines whether to retrieve, from memory, an image that is determined to be similar to the query image. In a case that this image is to be retrieved, step S710 accesses the appropriate memory (which may be either local or remote) and retrieves data for the image. The image may then be displayed, e.g., to a user, or output, e.g., via network connection 9. Thereafter, processing ends.

[Second Embodiment]

The second embodiment of the invention is identical to the first embodiment described above, except with respect to step S406 of FIG. 4. More specifically, in the first embodiment, step S406 stores data corresponding to an input image at end points of each binary tree. In the first embodiment, these end points are all located at a same level of the binary tree. This embodiment of the invention, however, builds the database adaptively, such that data for plural images can be stored at different levels of the binary tree. As a result smaller binary trees can be generated, thereby decreasing the overall size of the database and, consequently, the time that it takes to traverse the database.

In brief, in this embodiment, step S406 stores the data in the binary tree by comparing at least some bits in the binary representation to corresponding nodes up to a current node in the binary tree, and determining whether the current node in the binary tree stores data for more than a predetermined number of images. In a case that the current node in the binary tree stores data for more than the predetermined number of images, step S406 splits the current node into two subsequent nodes, and stores the data in the subsequent nodes. On the other hand, in a case that the current node in the binary tree stores data for less than or equal to the predetermined number of images, the step S406 stores the data at the current node in the binary tree. Consequently, data can be stored at fewer nodes, thereby decreasing the size of the database.

Figure 8:
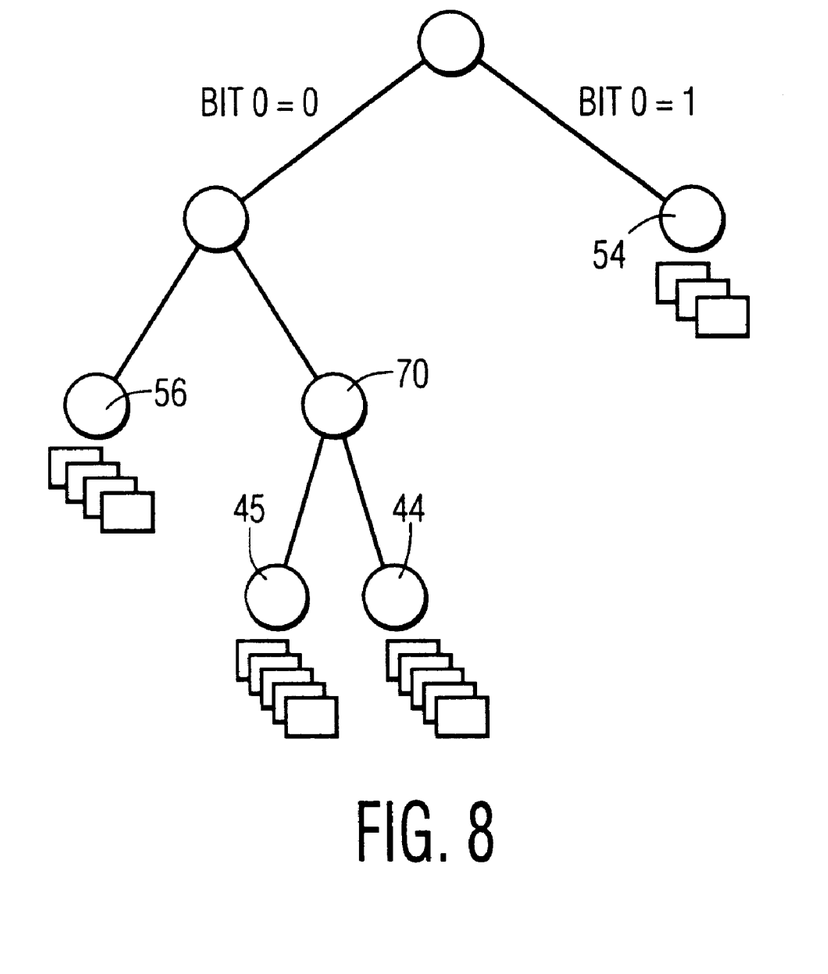
FIG. 8 shows a binary tree used in a database generated by the second embodiment of the present invention.

More specifically, as shown in FIGS. 6 and 8, in this embodiment, the invention stores data from nodes 50, 51, 52 and 53 of FIG. 6 in node 54 of FIG. 8, since during building of the binary tree the amount of data accumulated in node 54 is not sufficient to warrant node splitting. Likewise, in this embodiment, data from nodes 46 and 55 of FIG. 6 is combined and stored in node 56 of FIG. 8. Thus, as shown, the second embodiment of the invention eliminates eight nodes from the resulting binary tree, thereby reducing the size of the database considerably. As also shown, however, data from nodes 44 and 45 of FIG. 6 is not combined in FIG. 8, since the amount of data accumulated in node 70 during building of the binary tree warrants splitting into two separate nodes 44 and 45. The amount of data which will warrant node splitting may be set experimentally to provide optimum retrieval time while still maintaining a high degree of accuracy.

Once the data has been stored in the binary tree, the processing of the second embodiment is identical to that of the first embodiment. Since a description of this processing is provided above, it is not repeated here.

As noted above, although the invention is described in the context of a personal computer, the invention can be used with any apparatus which processes digital images. For example, the invention can be used in a digital television, such as that described in U.S. patent application Ser. No. 09/062,940, entitled "Digital Television System which Switches Channels In Response To Control Data In a Television Signal", the contents of which are hereby incorporated by reference into the subject application as if set forth herein in full. For example, the invention could be executed by the television's processor to locate a stored video clip based on a downloaded frame. That is, once the location of the frame is identified, the location of the video clip which includes the frame will also be identified.

Similarly, the invention could be used in a computer-controlled photocopier for pattern detection. For example, one problem with conventional photocopiers, and color copiers in particular, relates to copying currency, banknotes, and securities. That is, since it is illegal to copy such documents, copiers typically store these "prohibited" images in a memory, compare each scanned image to these prohibited images, and, when a prohibited image is detected (i.e., when the scanned image is substantially identical to an image stored in memory), prevent copying. The database of the present invention thus can be used to determine whether a scanned image corresponds to one of these prohibited images.

Finally it is noted that the process steps shown in FIGS. 4 and 7 need not necessarily be executed in the exact order shown, and that the order shown is merely one way for the invention to operate. Thus, other orders of execution are permissible, so long as the functionality of the invention is substantially maintained.

In this regard, the present invention has been described with respect to particular illustrative embodiments. It is to be understood that the invention is not limited to the above-described embodiments and modifications thereto, and that various changes and modifications may be made by those of ordinary skill in the art without departing from the spirit and scope of the appended claims.

What is claimed is:

1. A method of building a database which stores data corresponding to a plurality of images, wherein for each image, the method comprises the steps of:

dividing the image into N (N≧1) regions; and for each of the N regions:
calculating a histogram of the region;
generating a binary representation of the histogram; and
storing data corresponding to the image in a binary tree based on the binary representation.

2. A method according to claim 1, wherein the data corresponding to the image comprises a pointer to the image in memory.

3. A method according to claim 1, wherein the calculating step calculates the histogram for the region based on color image data in the region.

4. A method according to claim 1, wherein the generating step comprises:

performing a Haar transform on the histogram to generate wavelet coefficients therefor; and quantizing the coefficients to generate the binary representation.

5. A method according to claim 1, wherein the storing step comprises:

traversing the binary tree using the binary representation; and storing the data corresponding to the image at an end point of the binary tree.

6. A method according to claim 5, wherein the traversing step comprises comparing each bit in the binary representation to a corresponding node in the binary tree, and branching left or right in the binary tree based on whether a match is achieved until reaching the end point.

7. A method according to claim 1, wherein the storing step comprises:

comparing at least some bits in the binary representation to corresponding nodes up to a current node in the binary tree; and determining whether the current node in the binary tree stores data for more than a predetermined number of images;

wherein, in a case that the current node in the binary tree stores data for more than the predetermined number of images, the storing step splits the current node into two subsequent nodes, and stores the data in the subsequent nodes; and wherein, in a case that the current node in the binary tree stores data for less than or equal to the predetermined number of images, the storing step stores the data at the current node in the binary tree.

8. A method according to claim 1, wherein the storing step stores data corresponding to the image in N separate binary trees, one binary tree for each of the N regions of the image.

9. A method according to claim 1, wherein the N regions comprise N contiguous rectangular regions of the image.

10. A method of determining which images in a database are similar to a query image, where the database is comprised of N (N≧1) binary trees, and where each of the N binary trees stores data corresponding to one or more predetermined images, the method comprising the steps of:

dividing the query image into N regions, each of the N regions corresponding to one of the N binary trees;

retrieving data corresponding to one or more predetermined images from binary trees corresponding to the N regions; and determining which of the predetermined images is similar to the query image based on the data retrieved in the retrieving step.

11. A method according to claim 10, wherein the retrieving step comprises, for each of the N regions of the query image:

calculating a histogram of the region;

generating a binary representation of the histogram; and retrieving data corresponding to one or more predetermined images by traversing a binary tree that corresponds to the region using the binary representation of the histogram.

12. A method according to claim 11, wherein the calculating step calculates the histogram based on color image data in the region.

13. A method according to claim 11, wherein the generating step comprises:

performing a Haar transform on the histogram to generate wavelet coefficients therefor; and quantizing the coefficients to generate the binary representation.

14. A method according to claim 10, wherein the data corresponding to the one or more predetermined images comprises pointers to the predetermined images in memory; and wherein the determining step determines which of the predetermined images is similar to the query image based on which pointers were retrieved by the retrieving step.

15. A method according to claim 14, wherein a predetermined image for which a most number of pointers was retrieved by the retrieving step is determined to be most similar to the query image.

16. A method according to claim 10, wherein the determining step comprises:

identifying candidate images among the predetermined images that could correspond to the query image;

ranking the candidate images in order from an image most likely to correspond to the query image to an image least likely to correspond to the query image; and displaying a list of the ranked candidate images.

17. A method according to claim 16, wherein the ranking step ranks the candidate images based on the data retrieved by the retrieving step.

18. A method according to claim 10, wherein the data retrieved in the retrieving step comprises pointers to images in memory; and further comprising the step of retrieving at least one predetermined image that is similar to the query image based on a retrieved pointer.

19. Computer-executable process steps stored on a computer-readable medium, the computer-executable process steps to build a database which stores data corresponding to a plurality of images, the computer-executable process steps comprising:

code which divides each image into N (N≧1) regions; and code which, for each of the N regions, (i) calculates a histogram of the region, (ii) generates a binary representation of the histogram, and (iii) stores data corresponding to the image in a binary tree based on the binary representation.

20. Computer-executable process steps according to claim 19, wherein the data corresponding to the image comprises a pointer to the image in memory.

21. Computer-executable process steps according to claim 19, wherein the calculating code calculates the histogram for the region based on color image data in the region.

22. Computer-executable process steps according to claim 19, wherein the generating code comprises:

code which performs a Haar transform on the histogram to generate wavelet coefficients therefor; and code which quantizes the coefficients to generate the binary representation.

23. Computer-executable process steps according to claim 19, wherein the storing code comprises:

code which traverses the binary tree using the binary representation; and code which stores the data corresponding to the image at an end point of the binary tree.

24. Computer-executable process steps according to claim 23, wherein the traversing code compares each bit in the binary representation to a corresponding node in the binary tree, and branches left or right in the binary tree based on whether a match is achieved until reaching the end point.

25. Computer-executable process steps according to claim 19, wherein the storing code comprises:

code which compares at least some bits in the binary representation to corresponding nodes up to a current node in the binary tree; and code which determines whether the current node in the binary tree stores data for more than a predetermined number of images;

wherein, in a case that the current node in the binary tree stores data for more than the predetermined number of images, the storing code splits the current node into two subsequent nodes, and stores the data in the subsequent nodes; and wherein, in a case that the current node in the binary tree stores data for less than or equal to the predetermined number of images, the storing code stores the data at the current node in the binary tree.

26. Computer-executable process steps according to claim 19, wherein the storing code stores data corresponding to the image in N separate binary trees, one binary tree for each of the N regions of the image.

27. Computer-executable process steps according to claim 19, wherein the N regions comprise N contiguous rectangular regions of the image.

28. Computer-executable process steps stored on a computer-readable medium, the computer-executable process steps to determine which images in a database are similar to a query image, where the database is comprised of N (N≧1) binary trees, and where each of the N binary trees stores data corresponding to one or more predetermined images, the computer-executable process steps comprising:

code to divide the query image into N regions, each of the N regions corresponding to one of the N binary trees;

code to retrieve data corresponding to one or more predetermined images from binary trees corresponding to the N regions; and code to determine which of the predetermined images is similar to the query image based on the data retrieved by the retrieving code.

29. Computer-executable process steps according to claim 28, wherein the retrieving code comprises code which, for each of the N regions of the query image, calculates a histogram of the region, generates a binary representation of the histogram, and retrieves data corresponding to one or more predetermined images by traversing a binary tree that corresponds to the region using the binary representation of the histogram.

30. Computer-executable process steps according to claim 29, wherein the calculating code calculates the histogram based on color image data in the region.

31. Computer-executable process steps according to claim 29, wherein the generating code comprises:
   code which performs a Haar transform on the histogram to generate wavelet coefficients therefor; and
   code which quantizes the coefficients to generate the binary representation.

32. Computer-executable process steps according to claim 28, wherein the data corresponding to the one or more predetermined images comprises pointers to the predetermined images in memory; and
   wherein the determining code determines which of the predetermined images is similar to the query image based on which pointers were retrieved by the retrieving code.

33. Computer-executable process steps according to claim 32, wherein a predetermined image for which a most number of pointers was retrieved by the retrieving code is determined to be most similar to the query image.

34. Computer-executable process steps according to claim 28, wherein the determining code comprises:
   code to identify candidate images among the predetermined images that could correspond to the query image;
   code to rank the candidate images in order from an image most likely to correspond to the query image to an image least likely to correspond to the query image; and
   code to display a list of the ranked candidate images.

35. Computer-executable process steps according to claim 34, wherein the ranking code ranks the candidate images based on the data retrieved by the retrieving code.

36. Computer-executable process steps according to claim 28, wherein the data retrieved by the retrieving code comprises pointers to images in memory; and
   further comprising code to retrieve at least one predetermined image that is similar to the query image based on a retrieved pointer.

37. An apparatus for building a database which stores data corresponding to a plurality of images, the apparatus comprising:
   a memory which stores computer-executable process steps; and
   a processor which executes the process steps so as to divide each image into N (N≧1) regions, and for each of the N regions, (i) to calculate a histogram of the region, (ii) to generate a binary representation of the histogram, and (iii) to store data corresponding to the image in a binary tree based on the binary representation.

38. An apparatus according to claim 37, wherein the data corresponding to the image comprises a pointer to the image in memory.

39. An apparatus according to claim 37, wherein the processor calculates the histogram for the region based on color image data in the region.

40. An apparatus according to claim 37, wherein the processor generates the binary representation of the histogram by (i) performing a Haar transform on the histogram to generate wavelet coefficients therefor, and (ii) quantizing the coefficients.

41. An apparatus according to claim 37, wherein the processor stores the data by (i) traversing the binary tree using the binary representation, and (ii) storing the data corresponding to the image at an end point of the binary tree.

42. An apparatus according to claim 41, wherein the processor traverses the binary tree by (i) comparing each bit in the binary representation to a corresponding node in the binary tree, and (ii) branching left or right in the binary tree based on whether a match is achieved.

43. An apparatus according to claim 37, wherein the processor stores the data by (i) comparing at least some bits in the binary representation to corresponding nodes up to a current node in the binary tree, and (ii) determining whether the current node in the binary tree stores data for more than a predetermined number of images;
   wherein, in a case that the current node in the binary tree stores data for more than the predetermined number of images, the processor splits the current node into two subsequent nodes, and stores the data in the subsequent nodes; and
   wherein, in a case that the current node in the binary tree stores data for less than or equal to the predetermined number of images, the processor stores the data at the current node in the binary tree.

44. An apparatus according to claim 37, wherein the processor stores data corresponding to the image in N separate binary trees, one binary tree for each of the N regions of the image.

45. An apparatus according to claim 37, wherein the N regions comprise N contiguous rectangular regions of the image.

46. An apparatus according to claim 37, further comprising:
   a network interface which interfaces the apparatus to a network; and
   a server which stores the database, the server being located remotely from the apparatus on the network.

47. An apparatus for determining which images in a database are similar to a query image, where the database is comprised of N (N≧1) binary trees, and where each of the N binary trees stores data corresponding to one or more predetermined images, the apparatus comprising:
   a memory which stores computer-executable process steps; and
   a processor which executes the process steps so as (i) to divide the query image into N regions, each of the N regions corresponding to one of the N binary trees, (ii) to retrieve data corresponding to one or more predetermined images from binary trees corresponding to the N regions, and (iii) to determine which of the predetermined images is similar to the query image based on the retrieved data.

48. An apparatus according to claim 47, wherein for each of the N regions of the query image, the processor retrieves the data by (i) calculating a histogram of the region, (ii) generating a binary representation of the histogram, and (iii) retrieving data corresponding to one or more predetermined images by traversing a binary tree that corresponds to the region using the binary representation of the histogram.

49. An apparatus according to claim 48, wherein the processor calculates the histogram based on color image data in the region.

50. An apparatus according to claim 48, wherein the processor generates the binary representation of the histogram by (i) performing a Haar transform on the histogram to generate wavelet coefficients therefor, and (ii) quantizing the coefficients to generate the binary representation.

51. An apparatus according to claim 47, wherein the data corresponding to the one or more predetermined images comprises pointers to the predetermined images in memory; and wherein the processor determines which of the predetermined images is similar to the query image based on which pointers were retrieved.

52. An apparatus according to claim 51, wherein a predetermined image for which a most number of pointers was retrieved by the processor is determined to be most similar to the query image.

53. An apparatus according to claim 47, wherein the processor determines which of the predetermined images is similar to the query image by (i) identifying candidate images among the predetermined images that could correspond to the query image, (ii) ranking the candidate images in order from an image most likely to correspond to the query image to an image least likely to correspond to the query image, and (iii) displaying a list of the ranked candidate images.

54. An apparatus according to claim 53, wherein the processor ranks the candidate images based on the retrieved data corresponding to the one or more predetermined images.

55. An apparatus according to claim 47, wherein the data retrieved by the processor comprises pointers to images in memory; and wherein the processor further executes process steps so as to retrieve at least one predetermined image that is similar to the query image based on a retrieved pointer.

56. An apparatus according to claim 47, wherein the apparatus is a personal computer.

57. An apparatus according to claim 47, wherein the apparatus is a photocopier.

58. An apparatus according to claim 47, wherein the apparatus is a digital television.

59. An apparatus according to claim 47, further comprising:

a network interface which interfaces the apparatus to a network; and a server on the network which stores the database, the server being located remotely from the apparatus on the network.

* * * * *